(12) United States Patent
Nagura

(10) Patent No.: US 8,546,747 B2
(45) Date of Patent: Oct. 1, 2013

(54) ROTARY ENCODER AND OPTICAL APPARATUS

(75) Inventor: Chihiro Nagura, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/238,656

(22) Filed: Sep. 21, 2011

(65) Prior Publication Data

US 2012/0075622 A1  Mar. 29, 2012

(30) Foreign Application Priority Data

Sep. 24, 2010 (JP) ................. 2010-213194

(51) Int. Cl.
*G01D 5/347* (2006.01)
*G01D 5/36* (2006.01)

(52) U.S. Cl.
USPC ................ 250/231.14; 250/231.16

(58) Field of Classification Search
USPC ........... 250/216, 229, 231.1, 231.13–231.18, 250/237 G, 237 R; 356/614–619; 33/700, 33/706, 707
See application file for complete search history.

(56) References Cited

U.S. PATENT DOCUMENTS

| | | | | |
|---|---|---|---|---|
| 3,757,128 A * | 9/1973 | Vermeulen | ............... | 250/231.16 |
| 4,384,204 A * | 5/1983 | Tamaki et al. | ............ | 250/237 G |
| 4,465,373 A * | 8/1984 | Tamaki et al. | ................ | 356/617 |
| 4,496,835 A * | 1/1985 | Boella et al. | ............. | 250/231.16 |
| 4,606,008 A * | 8/1986 | Wason | ........................... | 702/151 |
| 4,639,108 A * | 1/1987 | Sakai et al. | ..................... | 396/72 |
| 4,774,463 A * | 9/1988 | Mizobuchi et al. | ........... | 324/175 |
| 5,017,776 A * | 5/1991 | Loewen | .................... | 250/231.14 |
| 5,091,643 A * | 2/1992 | Okutani et al. | ......... | 250/231.14 |
| 5,214,426 A * | 5/1993 | Minohara et al. | ............... | 341/13 |
| 5,233,407 A * | 8/1993 | Ogata | ........................... | 356/619 |
| 5,691,646 A * | 11/1997 | Sasaki | ........................... | 324/662 |
| 6,411,376 B1 * | 6/2002 | Southam et al. | ........... | 356/237.1 |
| 6,437,332 B2 * | 8/2002 | Gibbons et al. | .............. | 250/340 |
| 6,552,330 B2 * | 4/2003 | Blasing | .................... | 250/231.13 |
| 7,084,390 B2 * | 8/2006 | Mayer | .................... | 250/231.16 |
| 7,164,120 B2 * | 1/2007 | Strasser | .................. | 250/231.16 |
| 7,875,844 B2 * | 1/2011 | Sheu et al. | ............... | 250/231.16 |
| 8,309,906 B2 * | 11/2012 | Kapner et al. | ........... | 250/231.16 |
| 2010/0127162 A1 * | 5/2010 | Lum et al. | ................ | 250/231.18 |
| 2011/0069390 A1 * | 3/2011 | Yoshida et al. | ............... | 359/573 |
| 2011/0147572 A1 * | 6/2011 | Nakamura | .............. | 250/231.16 |
| 2011/0303831 A1 * | 12/2011 | Nagura | .................... | 250/231.14 |
| 2012/0075622 A1 * | 3/2012 | Nagura | ........................ | 356/138 |

FOREIGN PATENT DOCUMENTS

| | | |
|---|---|---|
| JP | 06-018285 A | 1/1994 |
| JP | 2006-214929 A | 8/2006 |

\* cited by examiner

*Primary Examiner* — John Lee

(74) *Attorney, Agent, or Firm* — Rossi, Kimms & McDowell LLP

(57) ABSTRACT

The rotary encoder includes a rotary scale in which a spiral pattern is formed, and a sensor unit including a light source and a first light-receiving part that detects light entering via the spiral pattern. A first reading area where the first light-receiving part reads the spiral pattern includes at least one cycle of the spiral pattern in a radial direction over an entire rotational angle range of the rotary scale. The first light-receiving part outputs sinusoidal signals corresponding to a radial cycle of the spiral pattern. The signal processor produces a first phase signal from two phase sinusoidal signals produced based on the sinusoidal signals output from the first light-receiving part, and produces, based on the first phase signal, a rotational angle signal showing a rotational angle of the rotary scale.

8 Claims, 5 Drawing Sheets

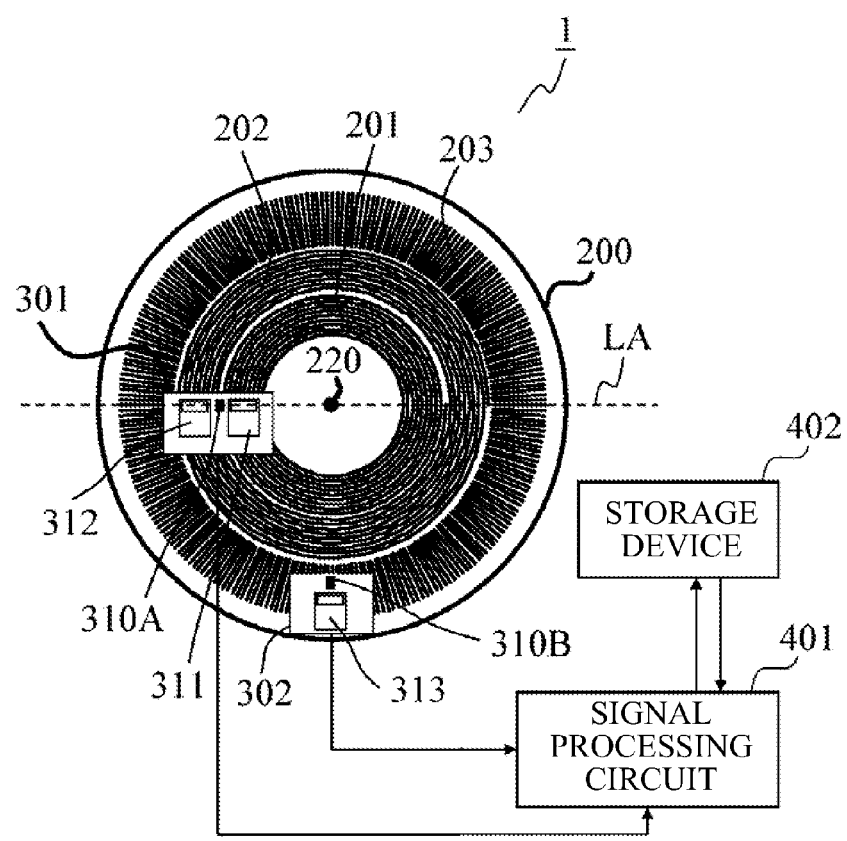
FIG. 1
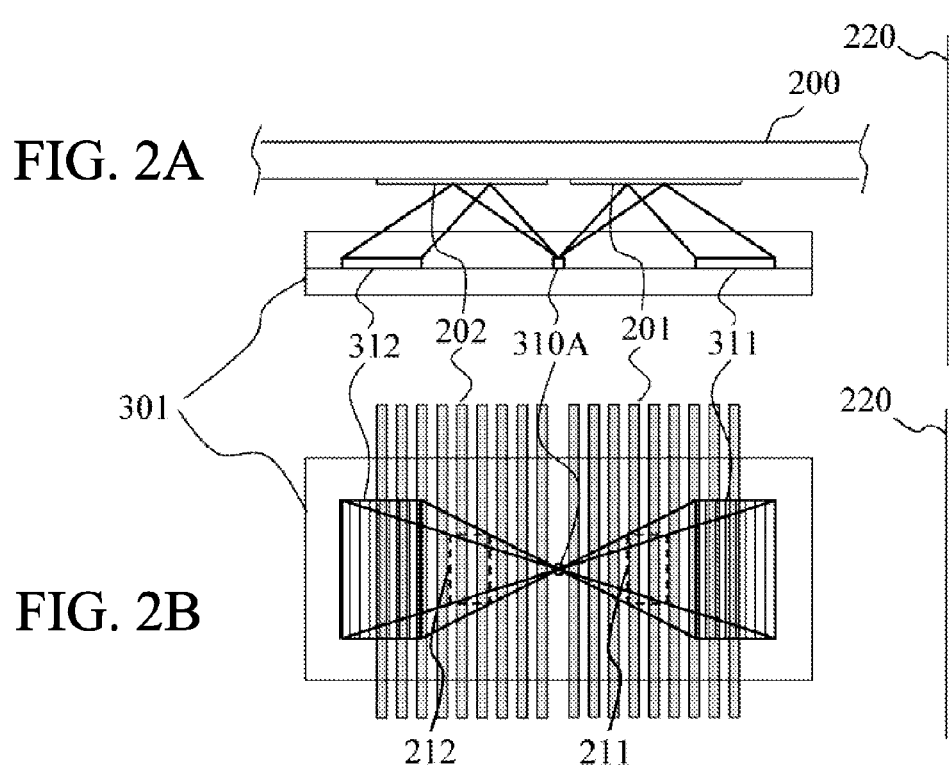
FIG. 2A
FIG. 2B

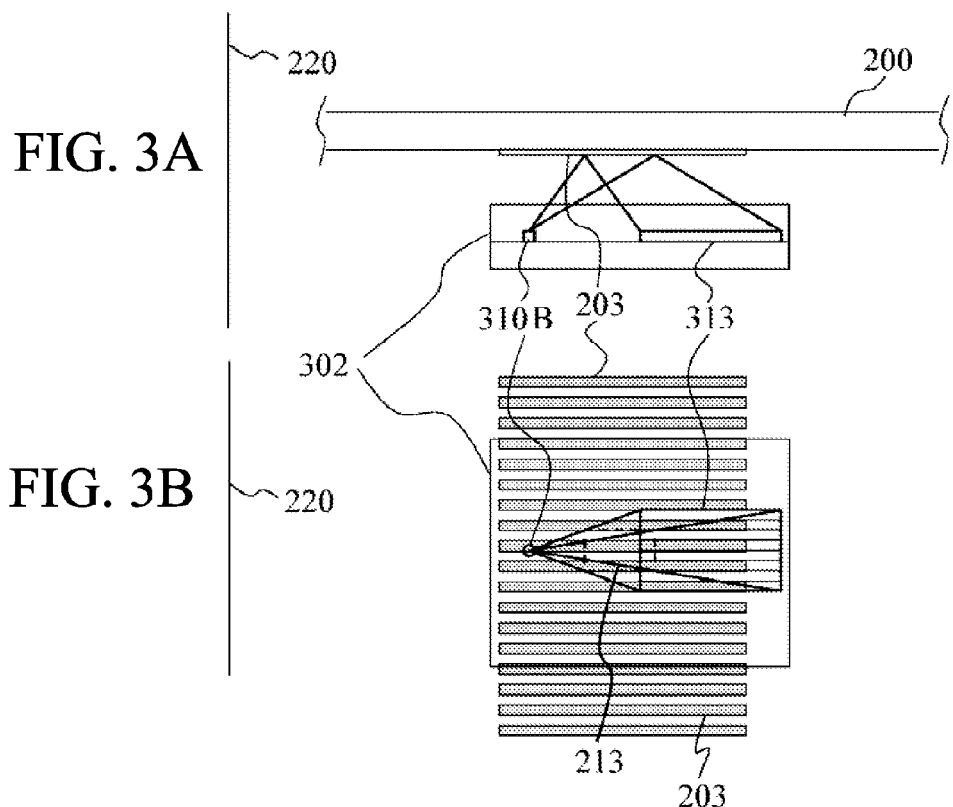
FIG. 3A
FIG. 3B
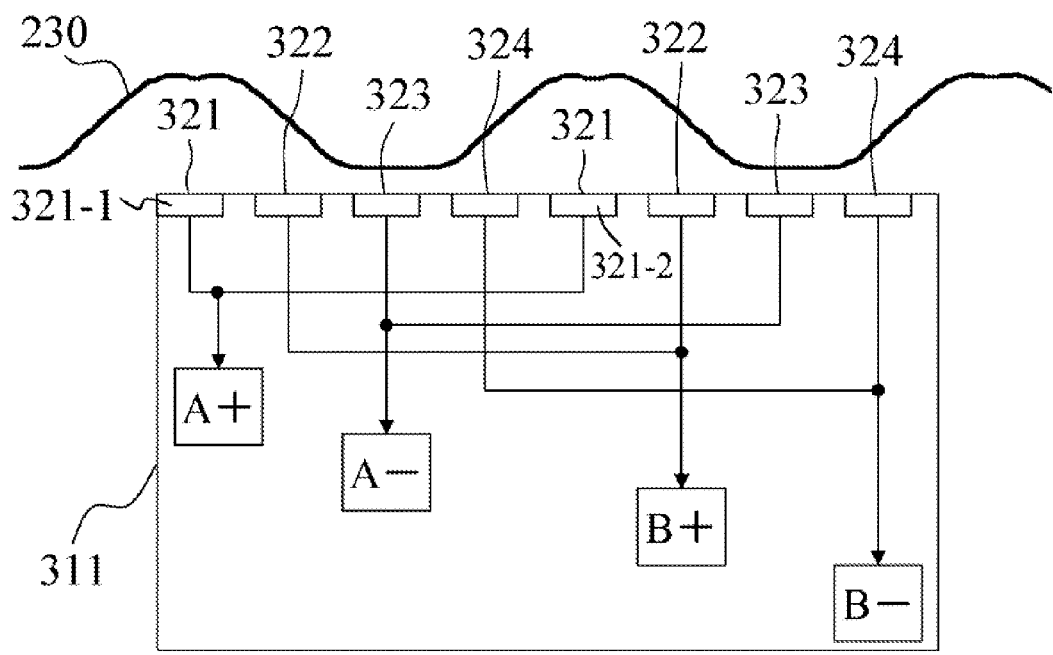
FIG. 4

ROTARY ENCODER AND OPTICAL APPARATUS

BACKGROUND OF THE INVENTION

1. Field of the Invention

The present invention relates to a rotary encoder capable of detecting rotational information such as a rotational speed or a rotational angle of a rotating object with high accuracy.

2. Description of the Related Art

Rotary encoders are often used as detectors for detecting rotational information of a rotating member used in machine tools and FA apparatuses, as disclosed in Japanese Patent Laid-Open Nos. 2006-214929 and 06-18285. Angle detection methods using the rotary encoder are roughly divided into an incremental method that detects relative rotational information and an absolute method that detects absolute rotational information. The incremental method using an optical encoder disclosed in Japanese Patent Laid-Open No. 2006-214929 simplifies the configuration of the encoder. However, the incremental method has problems that a power-off may cause a loss of the rotational information and that detection errors caused due to an exogenous noise may accumulate.

On the other hand, the rotary encoder for the absolute method generally has advantages that highly accurate detection is easily performed since the detection errors caused due to the exogenous noise do not accumulate and that a movement to a home position is not necessary when the power is off. An absolute rotary encoder disclosed in Japanese Patent Laid-Open No. 06-18285 uses a spiral scale in which a detection light-transmissive portion is formed spirally around a rotation center, the spiral scale being formed in a rotating plate attached to a rotating axle. In this absolute rotary encoder, of light fluxes emitted from an LED, a light flux transmitted through the detection light-transmissive portion in the spiral scale is detected by a detection optical position sensitive detector (hereinafter referred to as a "detection PSD").

Since the detection light-transmissive portion is spirally formed, a radial entrance position of the light flux entering the detection PSD continuously changes according to a rotational angle θ of the rotating plate (rotating axle). The detection PSD outputs a signal corresponding to the radial entrance position of the light flux, and thereby the output signal (detection light-receiving signal) of the detection PSD is linearly changed with the rotational angle θ. Therefore, calculation of the rotational angle θ of the spiral scale (that is, of the rotating axle) can be made based on the detection light-receiving signal. In addition, a light flux transmitted through a reference light-transmissive portion formed circularly centering on the rotation center in the rotating plate is received by a reference PSD. Subtracting a light-receiving signal output from the reference PSD from the light-receiving signal output from the detection PSD makes it possible to eliminate influences of decentering and backlash of the spiral scale with respect to the rotating axle.

Furthermore, there is a discontinuous area in the spiral detection light-transmissive portion near a circumferential position corresponding to a rotational angle of 0 degree in the rotating plate disclosed in Japanese Patent Laid-Open No. 06-18285. In this discontinuous area in the spiral detection light-transmissive portion, the reference PSD is disposed such that a light flux transmitted through a recognition light-transmissive portion (recognition area) formed in the reference light-transmissive portion may be detected by the reference PSD. Entrance of the light flux transmitted through the recognition light-transmissive portion into the reference PSD increases a light-receiving quantity of the reference PSD, which makes it possible to recognize that the rotating plate is rotated in the recognition area corresponding to the discontinuous area and then perform a calculation process for the discontinuous area. The rotational angle θ is thus detected over an entire rotational angle range of the rotating plate.

In the rotary encoder disclosed in Japanese Patent Laid-Open No. 06-18285, an arrangement error of each PSD and a variation of ambient temperature may cause a detection position displacement between the discontinuous area of the spiral detection light-transmissive portion and the recognition area of the reference light-transmissive portion, which results in an angle detection error near the discontinuous area. For example, in a case where the reference PSD is disposed with a positional error with respect to the detection PSD in a rotation direction, detection of the recognition area does not match the position of the discontinuous area, which causes an incorrect calculation process. Moreover, the temperature variation varies a determination threshold level, which causes a problem of mismatch between the detection of the recognition area and the position of the discontinuous area.

BRIEF SUMMARY OF THE INVENTION

The present invention provides a rotary encoder capable of performing highly accurate angle detection over the entire rotational angle range regardless of the arrangement error of the detection element or the variation of the ambient temperature.

The present invention provides as one aspect thereof a rotary encoder including a rotary scale in which a spiral pattern is formed whose center is located at a rotation axis of the rotary scale, whose radius continuously changes in a rotation direction of the rotary scale, whose width and pitch in a radial direction of the rotary scale are constant, and whose reflectance or transmittance changes in the rotation direction, a sensor unit disposed so as to face the rotary scale and including a light source that illuminates the spiral pattern and a first light-receiving part that detects light entering thereinto via the spiral pattern, and a signal processor. The first light-receiving part is constituted by a first sensor array group including at least two sets of sensor arrays arranged at mutually different radial position. A first reading area where the first sensor array group reads the spiral pattern includes at least one cycle of the spiral pattern in the radial direction over an entire rotational angle range of the rotary scale. The first sensor array group outputs sinusoidal signals corresponding to a radial cycle of the spiral pattern. The signal processor produces a first phase signal from two phase sinusoidal signals produced based on the sinusoidal signals output from the first sensor array group. The signal processor produces, based on the first phase signal, a rotational angle signal showing a rotational angle of the rotary scale.

The present invention provides as another aspect thereof an optical apparatus including the above rotary encoder.

Other aspects of the present invention will become apparent from the following description and the attached drawings.

BRIEF DESCRIPTION OF THE DRAWINGS

FIG. 1 shows the configuration of a rotary encoder that is Embodiment 1 of the present invention.

FIG. 2 shows the configuration of a sensor unit 301 in Embodiment 1.

FIG. 3 shows the configuration of a sensor unit 302 in Embodiment 1.

FIG. 4 shows arrangement of light-receiving surfaces of a photodiode array in Embodiment 1.

DETAILED DESCRIPTION OF THE EMBODIMENTS

Figure 5:
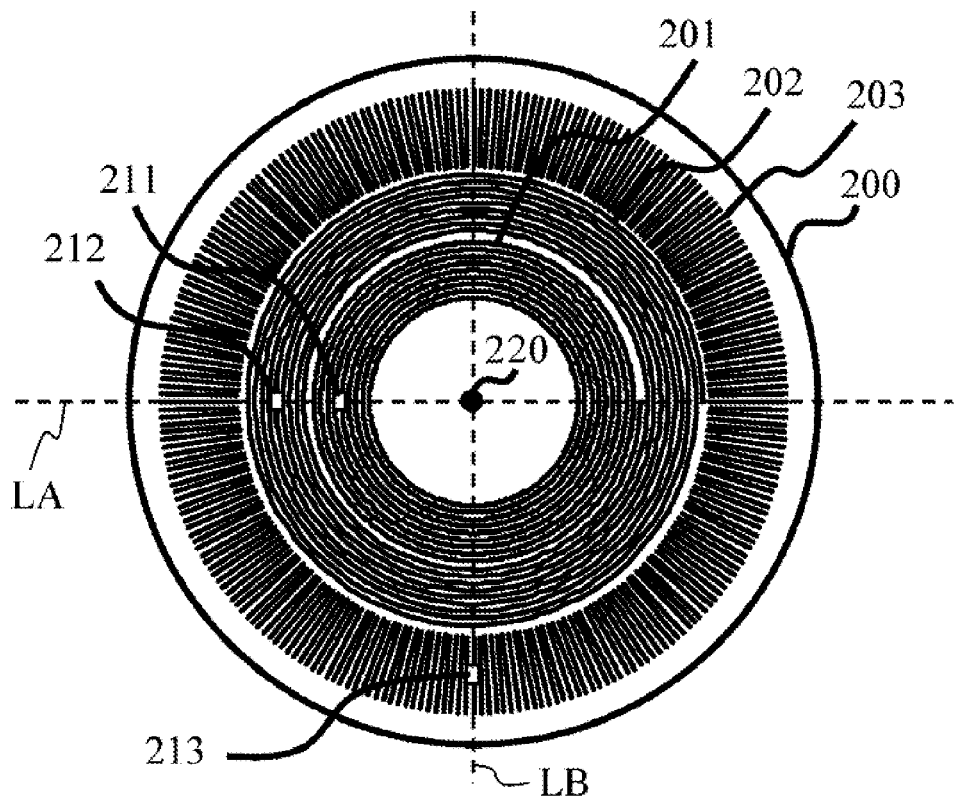
FIG. 5 shows scale patterns and sensor reading areas in Embodiment 1.

Exemplary embodiments of the present invention will hereinafter be described with reference to the accompanying drawings.

First, description will be made of an outline of a rotary encoder as a typical embodiment of the present invention with reference to FIG. 1. The rotary encoder includes a rotary scale 200 in which a spiral pattern (first scale pattern) 202 is formed whose center is located at a rotation axis (or a rotating axle) 220 of the rotary scale 200, whose radius continuously changes in a rotation direction of the rotary scale 200, whose width and pitch in a radial direction of the rotary scale 200 are constant, and whose reflectance or transmittance changes. The rotary encoder further includes a sensor unit 301 disposed so as to face the rotary scale 200 and including a light source 310A to illuminate the spiral pattern 202 and a first light-receiving part 312 to detect light entering thereinto via the spiral pattern 202. A rotational angle signal (absolute angle signal) θABS-out showing an absolute rotational angle of the rotary scale 200 is obtained from signals output from the sensor unit 301.

The first light-receiving part 312 is constituted by a first sensor array group including at least two pairs (sets) of sensor arrays arranged at mutually different radial positions. In a first reading area 212 where the first sensor array group reads the spiral pattern 202, at least one cycle of the spiral pattern 202 is included in the radial direction over an entire rotation angle range of the rotary scale 200. The first sensor array group outputs sinusoidal signals S(A+), S(B+), S(A−) and S(B−) that correspond to a radial cycle of the spiral pattern 202.

The rotary encoder further includes a signal processing circuit (signal processor) 401 that produces a first phase signal φ1 from two phase sinusoidal signals S(A) and S(B) produced based on the four sinusoidal signals S(A+), S(B+), S(A−) and S(B−) output from the first sensor array group. The signal processing circuit 401 produces the above-described rotational angle signal θABS-out based on the first phase signal (phase output) φ1.

Moreover, in the rotary scale 200 of this rotary encoder, concentric circle patterns (second scale pattern) 201 are formed whose centers are located at the rotation axis 220, whose widths and pitch in the radial direction are constant, and whose reflectance or transmittance changes.

The sensor unit 301 is illuminated with a light flux from the light source 310A. The sensor unit 301 further includes a second light-receiving part 311 that is disposed in a plane in which the first light-receiving part 312 is disposed and that detects the light entering thereinto via the concentric circle patterns 201 illuminated by the light source 310A.

The second light-receiving part 311 is constituted by a second sensor array group including at least two pairs (sets) of sensor arrays (321-324 in FIG. 4) arranged at mutually different radial positions. In a second reading area 211 where the second sensor array group reads the concentric circle patterns 201, at least one cycle of the concentric circle patterns 201 is included in the radial direction over the entire rotation angle range of the rotary scale 200. The second sensor array group outputs sinusoidal signals S(A+), S(B+), S(A−) and S(B−) that correspond to a radial cycle of the concentric circle patterns 201.

The signal processing circuit 401 produces a second phase signal φ2 from two phase sinusoidal signals S(A) and S(B) produced based on the four sinusoidal signals S(A+), S(B+), S(A−) and S(B−) output from the second sensor array group. The signal processing circuit 401 produces the above-described rotational angle signal θABS-out based on the first and second phase signals (phase outputs) φ1 and φ2. The first reading area 212 for the first sensor array group and the second reading area 211 for the second sensor array group on the rotary scale 200 are arranged on a same straight line passing through the rotation axis 220.

Furthermore, in the rotary scale 200, a radial slit pattern 203 is formed whose center is located at the rotation axis 220, and which is used to obtain an incremental signal (incremental angle signal). The rotary encoder further includes a sensor unit 302 disposed so as to face the rotary scale 200 and including a light source 310B to illuminate the radial slit pattern 203 and a third light-receiving part 313 to detect light entering thereinto via the radial slit pattern 203 to output the incremental signal.

Embodiment 1

Detailed description will hereinafter be made of a rotary encoder that is a first embodiment (Embodiment 1) of the present invention. FIG. 1 shows the configuration of the rotary encoder of Embodiment 1. FIGS. 2 and 3 respectively show the configurations of the sensor units 301 and 302. The rotary encoder includes, as described above, the rotary scale 200 attached to the rotating axle 220, the sensor units 301 and 302, the signal processing circuit 401 and a storage device 402. The sensor unit 301 receives light entering thereinto via the concentric circle patterns 201 and light entering thereinto via the spiral pattern 202 to output the signals for obtaining the rotational angle signal. The sensor unit 302 receives light entering thereinto via the radial slit pattern 203 to output the signals for obtaining the incremental signal. The signals output from the sensor units 301 and 302 are hereinafter also collectively referred to as "encoder signals".

The signal processing circuit 401 performs an interpolation process on the encoder signals from the sensor units 301 and 302, and performs signal writing and signal reading to and from the storage device 402.

FIGS. 2A and 2B show the configuration of the sensor unit 301 for absolute rotational angle detection. FIG. 2A is a side view of the sensor unit 301, and FIG. 2B is a top view thereof. The sensor unit 301 is configured as a light emitting and receiving integrated device in which an LED (light source) 310A, a photodiode array (second light-receiving part) 311 and a photodiode array (first light-receiving part) 312 are mounted in a same package. Divergent light fluxes emitted from the LED 310A toward the rotary scale 200 are projected onto the first reading area 212 on the spiral pattern 202 and onto the second reading area 211 on the concentric circle patterns 201.

As shown in FIG. 2B, the first reading area 212 on the spiral pattern 202 is an area surrounded by midpoints of lines connecting the LED 310A and four corners of a light-receiving area of the photodiode array 312. The second reading area 211 on the concentric circle patterns 201 is an area surrounded by midpoints of lines connecting the LED 310A and four corners of a light-receiving area of the photodiode array 311. The light flux reflected by the spiral pattern 202 in the first reading area 212 enters the photodiode array 312, and the light flux reflected by the concentric circle patterns 201 in the second reading area 211 enters the photodiode array 311.

The light fluxes received (read) by the photodiode arrays 311 and 312 are converted thereby into electrical signals, and the electrical signals as the encoder signals are sent to the signal processing circuit 401 shown in FIG. 1.

FIGS. 3A and 3B show the configuration of the sensor unit 302 for relative rotational angle detection. FIG. 3A is a side view of the sensor unit 302, and FIG. 3B is a top view thereof. The sensor unit 302 is configured as a light emitting and receiving integrated device in which an LED (light source) 310B and a photodiode array (third light-receiving part) 313 are mounted in a same package.

A divergent light flux emitted from the LED 310B toward the rotary scale 200 is projected onto a third reading area 213 on the radial slit pattern 203. As shown in FIG. 3B, the third reading area 213 on the radial slit pattern 203 is an area surrounded by midpoints of lines connecting the LED 310B and four corners of a light-receiving area of the photodiode array 313.

The light flux reflected by the radial slit pattern 203 in the third reading area 213 enters the photodiode array 313. The light flux received (read) by the photodiode array 313 is converted thereby into an electrical signal, and the electrical signal as the encoder signal (incremental signal) is sent to the signal processing circuit 401 shown in FIG. 1.

FIG. 4 shows arrangement of the sensor arrays (hereinafter also referred to as "light-receiving surface arrays") in the photodiode array 311. Description will be made of output signals of the rotary encoder with reference to FIG. 4. The light-receiving surface arrays, that is, an A+ phase light-receiving surface array 321, a B+ phase light-receiving surface array 322, an A− phase light-receiving surface array 323 and a B− phase light-receiving surface array 324 are respectively arranged at positions corresponding to 0, 90, 180 and 270 degrees in a cycle of a reflected scale image 230 received by the photodiode array 311. Each light-receiving surface array includes two light-receiving surfaces (for example, the A+ phase light-receiving surface array 321 includes two light-receiving surfaces 321-1 and 321-2). In this embodiment, the light-receiving surface arrays 321-324 are arranged with an interval of 200 μm between their centers. Each light-receiving surface has a lateral (phase detection direction) width of 40 μm and a longitudinal width (length) of 600 μm.

Thus, an effective reading area on the rotary scale 200 formed by each light-receiving surface array has a phase detection direction width of 120 μm (=(200 μm+40 μm)/2) and a longitudinal width (length) of 300 μm (=600 μm/2). These light-receiving surface array arrangement and dimensions also apply to the photodiode arrays 312 and 313. That is, each of the photodiode arrays 312 and 313 includes four light-receiving surface arrays (sensor arrays).

The A+ phase light-receiving surface array 321, the B+ phase light-receiving surface array 322, the A− phase light-receiving surface array 323 and the B− phase light-receiving surface array 324 output four phase sinusoidal signals S(A+), S(B+), S(A−) and S(B−). The sinusoidal signals S(B+), S(A−) and S(B−) respectively have relative phases of +90 degrees, +180 degrees and +270 degrees with respect to the sinusoidal signal S(A+) as a reference signal. The signal processing circuit 401 performs the following calculation on the output sinusoidal signals S(A+), S(B+), S(A−) and S(B−) to produce the two phase sinusoidal signals S(A) and S(B) from which a direct current component is removed:

$$S(A)=S(A+)-S(A-)$$

$$S(B)=S(B+)-S(B-).$$

The signal processing circuit 401 then performs arc tangent calculation on the two phase sinusoidal signals S(A) and S(B) to produce the second phase signal (phase output) φ2 as an output from the photodiode array 311. Similarly, the signal processing circuit 401 produces the first phase signal (phase output) φ1 as an output from the photodiode array 312, and produces a third phase signal (phase output) φ3 as an output from the photodiode array 313. Performing such phase calculation from the two phase sinusoidal signals S(A) and S(B) makes it possible to obtain stable outputs even if a variation in light intensity or gain is caused by a variation in temperature or the like.

FIG. 5 shows the patterns 201, 202 and 203 in the rotary scale 200 and arrangement of the reading areas 211, 212 and 213 of the sensor units 301 and 302. The first and second reading areas 212 and 211 of the photodiode arrays 312 and 311 are located on a same straight line LA passing through the rotation axis 220 and extending from the rotation axis 220 to a same side. The third reading areas 213 of the photodiode array 313 shown in FIG. 3 is located on a straight line LA passing through the rotation axis 220 and extending in a direction orthogonal to the straight line LA.

A center of the second reading area 211 of the sensor unit 301 is located at a position corresponding to a radius of 1.91 mm, and a center of the first reading area 212 thereof is located at a position corresponding to a radius of 2.86 mm. A center of the third reading area 213 of the sensor unit 302 is located at a position corresponding to a radius of 4.07 mm. In three patterning tracks (areas) of the rotary scale 201, chrome reflective films are formed as the patterns 201, 202 and 203 on a glass substrate.

Figure 6:
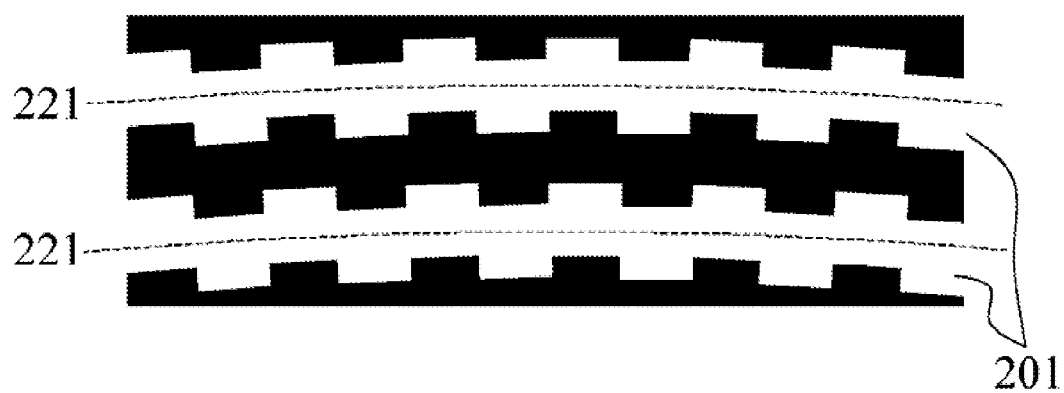
FIG. 6 shows part of concentric circular patterns in Embodiment 1.

In an area corresponding to a radius range from 1.5 mm to 2.3 mm, the concentric circle patterns 201 are formed whose centers are located at the rotation axis 201. FIG. 6 shows an enlarged view of part of the concentric circle patterns 201.

The concentric circle patterns 201 are constituted by circle patterns respectively extending along nine concentric circle reference lines 221 arranged with an equal radial interval of 100 μm. Each concentric circle pattern 201 has a radial width of 50 μm, and a radial width center thereof alternately shifts radially inward and outward by 8.333 μm with respect to the concentric circle reference line 221 at each azimuth angle of 1.5 degrees. In the vicinity of a position corresponding to a radius of 1.91 mm, which is the center of the second reading area 211, a cycle of the shift becomes 100 μm, that is, ⅓ of a circumferential length of the second reading area 212 of the photodiode array 311.

Each concentric circle pattern 201 is thus radially displaced at a constant angular cycle, and an integral multiple (triple) of the constant angular cycle is equal to the circumferential length (300 μm) of the second reading area 211 on the concentric circle patterns 201 for a circumferential length of the photodiode array 311. This configuration integrates an intensity distribution of the reflected scale image in the light-receiving surface area of the photodiode array 311 to cancel a triple frequency component (high-frequency component) included in the reflected scale image, which makes it possible to reduce a difference from an ideal sine wave.

This embodiment adopts, for the patterns including the spiral pattern 202, measures to cancel only the triple frequency component. However, alternative measures to cancel other integral multiple frequency components can be adopted such as a multi-step shift pattern or a continuous shift pattern.

Figure 7:
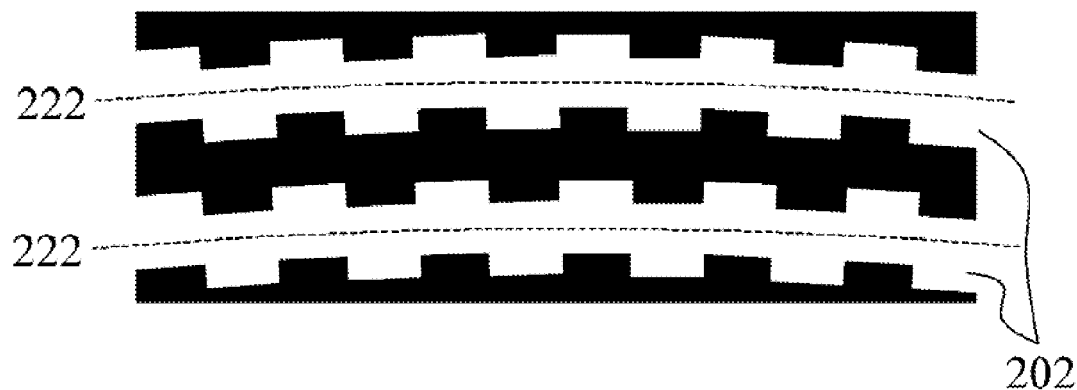
FIG. 7 shows part of a spiral pattern in Embodiment 1.

In an area on the rotary scale 200 corresponding to a radius range from 2.4 mm to 3.3 mm, the spiral pattern 202 is formed whose center is located at the rotation axis 220. FIG. 7 is an enlarged view of part of the spiral pattern 202. When a represents a radial pitch of the scale pattern 202, and r and θ respectively represent a radius and a phase angle on the rotary scale 200, the spiral pattern 202 is formed along a spiral reference line 222 that is expressed as follows:

$$r=(a/360)\theta.$$

The radial width of the spiral pattern 202 is 50 μm.

In this embodiment, the radial pitch a of the scale pattern 202 is 100 μm. A phase angle θmin of an inner circumference side end of the spiral reference line 222 is 8640 degrees, and a phase angle θmax of an outer circumference side end thereof is 11880 degrees. A radial width center of the spiral pattern 202 alternately shifts radially inward and outward by 8.333 μm with respect to the spiral reference line 222 at each azimuth angle of 1 degree. In the vicinity of a position corresponding to a radius of 2.86 mm, which is the center of the first reading area 212, a cycle of the shift is 100 μm, that is, ⅓ of a circumferential length of the first reading area 212 of the photodiode array 312.

The spiral pattern 202 is thus radially displaced at a constant angular cycle, and an integral multiple (triple) of the constant angular cycle is equal to the circumferential length (300 μm) of the first reading area 212 on the spiral pattern 202 for the circumferential length of the photodiode array 312. This configuration makes it possible to reduce a difference from an ideal sine wave, as well as for the concentric circle patterns 201.

In an area on the rotary scale 200 corresponding to a radius range from 3.4 mm to 4.5 mm, the radial slit pattern 203 in which 256 reflective films (or slits) having an equal angular interval are included in the whole circumferential area is formed. A center of the radial slit pattern 203 is located at the rotation axis 220. A duty ratio of the reflective film in the rotation direction is 50%. In the vicinity of a position corresponding to a radius of 4.07 mm, which is the center of the third reading area 213, a slit width of the radial slit pattern 203 is 50 μm.

[Relationship Between Photodiode Array Width and Scale Pattern Width]

Description will hereinafter be made of a relationship between the width of the photodiode array 312 and the width of the scale pattern 202. First, description will be made of a reading area of the photodiode array 312 for the above-described A+ phase on the rotary scale 200. The reading area for the A+ phase is an area from +100 μm to −20 μm, which is shifted outward from the center of the entire first reading area 212 of the photodiode array 312. The following description assumes that there are installation errors of the sensor unit 301 and the rotary scale 200. Specifically, the description assumes that the installation error of the sensor unit 301 is 0.2 mm outward in the radial direction, and the rotary scale 200 is decentered by 0.05 mm with respect to the rotation axis 220.

In this case, since a design center position of the first reading area 212 of the photodiode array 312 is the 2.86 mm radius position as described above, the reading area for the A+ phase set in consideration of the installation error of the sensor unit 301 is an area corresponding to a radius range of 3.04-3.16 mm. Moreover, the reading area for the A+ phase set in consideration of the 0.05 mm decentering of the rotary scale 200 with respect to the rotation axis 220 is an area corresponding to a radius range of 2.99-3.21 mm. On the other hand, an outer circumference side minimum radius of the reflective portion (film) of the spiral pattern 202 is 3.217 mm.

Therefore, even when there is the installation error of the sensor unit 301 or the decentering of the rotary scale 200, if it is within the design range, at least one cycle of the scale pattern is always continuously included in the reading area for the A+ phase.

In other words, the first reading area 212 for reading the spiral pattern 202 includes at least one cycle of the spiral pattern 202 in the radial direction over the entire rotational angle range of the rotary scale 200. This also applies to the A−, B+ and B− phases. This configuration enables acquisition of seamless and continuous phase outputs. Moreover, this also applies to the second reading area 211 of the photodiode array 311. That is, the second reading area 211 for reading the concentric circle patterns 201 includes at least one cycle of the concentric circle patterns 201 in the radial direction over the entire rotational angle range of the rotary scale 200.

In addition, description will hereinafter be made of a method of calculating the absolute angle. In this description, the phase output from the photodiode array 311 for detecting the concentric circle patterns 201 is represented by $\phi 2$, and the phase output from the photodiode array 312 for detecting the spiral pattern 202 is represented by $\phi 1$. An upper-order signal (rough angle signal) $\phi ABS$ is obtained by the following calculation:

$$\phi ABS=\phi 1-\phi 2.$$

As shown above, subtracting the phase output $\phi 2$ obtained from the concentric circle patterns 201 from the phase output $\phi 1$ obtained from the spiral pattern 202 makes it possible to cancel (correct) influences of decentering, tilting and bearing backlash.

Furthermore, arranging the reading areas 211 and 212 on the same straight line extending from the rotation axis 220 to the same side makes it possible to cancel error components having a correlation between patterns adjacent to each other, caused due to warpage of the rotary scale 200, a magnification error in pattern exposure or the like. In addition, the above-described subtraction is made after the phase calculation, which makes it possible to cancel the error component whose amount exceeds one scale cycle.

The phase output from the photodiode array 313 for detecting the radial slit pattern 203 is represented by $\phi 3$, and the phase output from the photodiode array 311 for detecting the concentric circle patterns 201 is represented by $\phi 2$. The incremental angle signal $\phi INC$ is obtained by the following calculation:

$$\phi INC=\phi 3-\phi 2.$$

As shown above, subtracting the phase output $\phi 2$ obtained from the concentric circle patterns 201 from the phase output $\phi 3$ obtained from the radial slit pattern 203 makes it possible to cancel the influences of decentering, tilting and bearing backlash.

Figure 8:
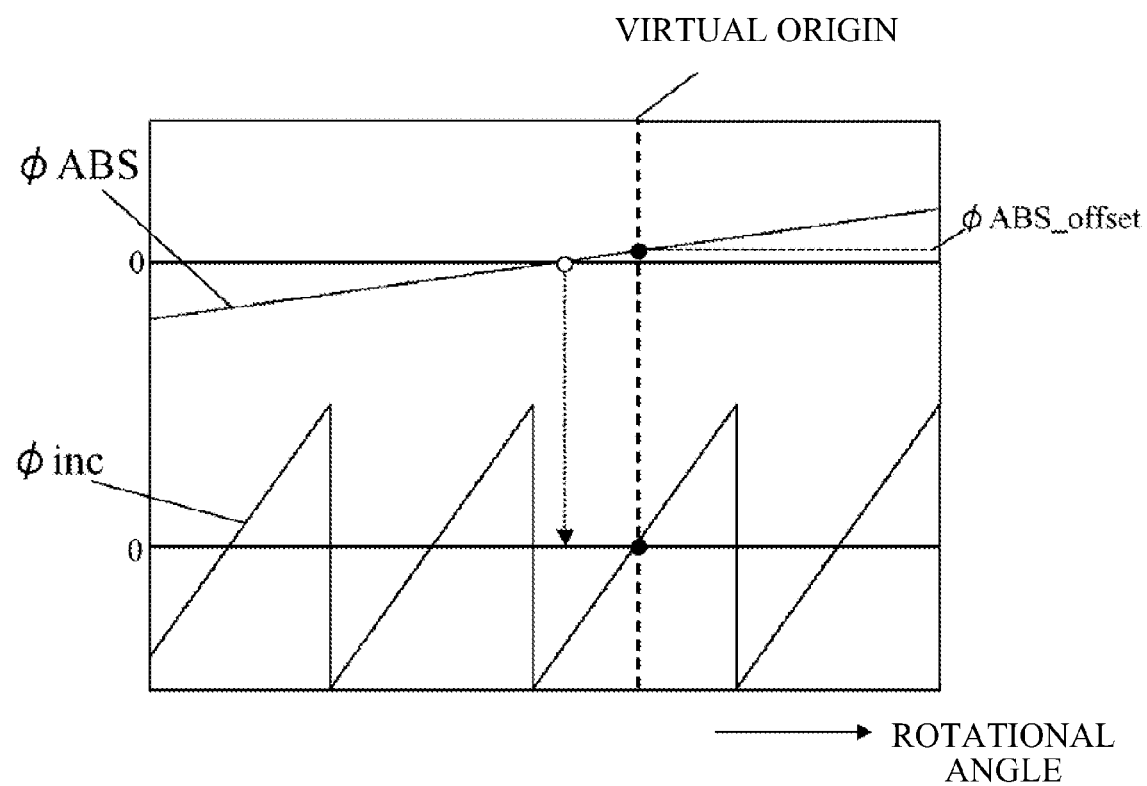
FIG. 8 shows an initialization operation in Embodiment 1.

Next, description will be made of a synchronous process of the upper-order angle signal $\phi ABS$ and the incremental angle signal $\phi INC$. First, description will be made of an initialization operation with reference to FIG. 8. The signal processing circuit 401 rotates the rotary scale 200 in a predetermined direction to detect a first zero crossing of the incremental angle signal $\phi INC$ after zero crossing of the upper-order angle signal $\phi ABS$, and sets a rotational angle corresponding to the first zero crossing to a virtual origin. The signal processing circuit 401 defines a phase of the upper-order angle signal φABS at the virtual origin as φABS_offset, and writes the phase φABS_offset to the storage device 402.

Next, description will be made of an angle detection operation. The signal processing circuit 401 acquires the rotational angle signal (absolute angel signal) θABS_out from the upper-order angle signal φABS, the incremental angle signal φINC and the phase φABS_offset stored in the storage device 402 by the following calculation:

$$\theta ABS\_out = Round[(\phi ABS - \phi ABS\_offset) - (\phi INC)/256] + \phi INC$$

where Round [ ] represents a function for rounding off a value in [ ].

The signal processing circuit 401 outputs the rotational angle signal θABS_out thus acquired. The rotational angle signal θABS_out may be acquired from the phase output φ1 of the photodiode array 312 as follows though an error due to the decentering is included:

$$\theta ABS\_out = \phi 1.$$

As described above, this embodiment configures the rotary encoder such that each of the reading areas 211, 212 and 213 of the sensor arrays (photodiode arrays) 311, 312 and 313 includes at least one cycle of the scale pattern in the radial direction over the entire rotational angle range, which prevents generation of discontinuous points in the phase detection. Thus, this embodiment enables acquisition of a highly accurate rotational angle signal (that is, enables highly accurate rotational angle detection) over the entire rotational angle range regardless of the sensor arrangement error or a variation of ambient temperature.

Embodiment 2

Description will be made of a second embodiment (Embodiment 2) of the present invention. Embodiment 2 uses as a spiral pattern for detecting the absolute rotational angle, not a single spiral pattern, but multiple spiral patterns 204.

Figure 9:
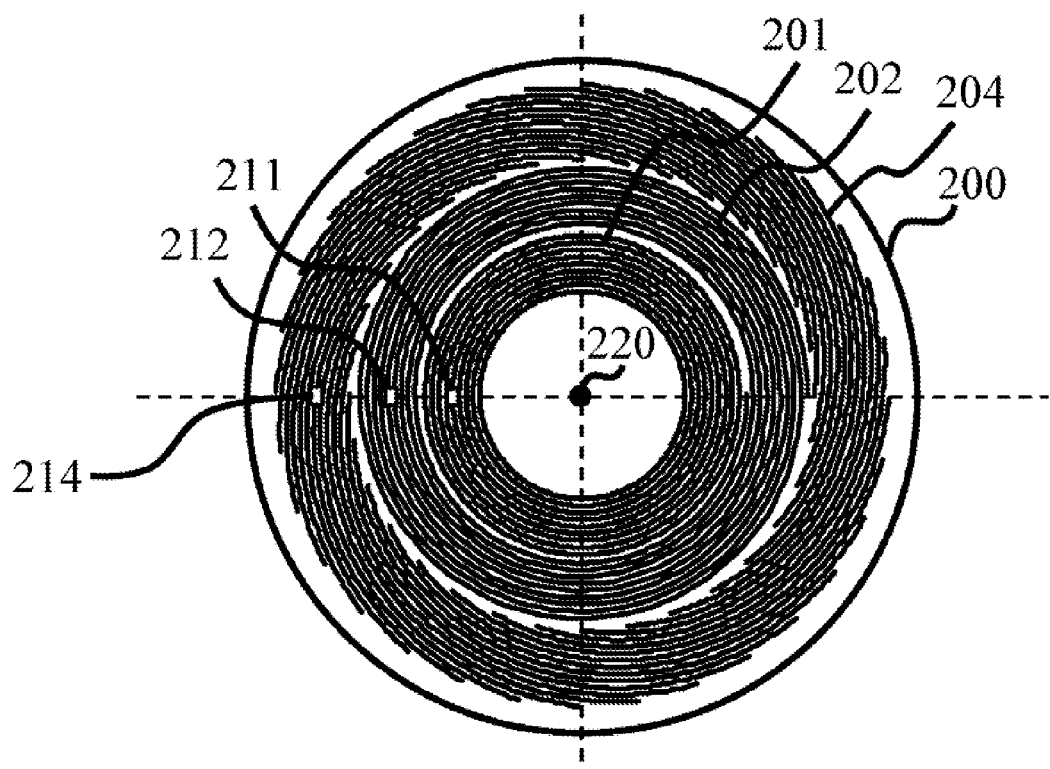
FIG. 9 shows scale patterns and sensor reading areas in Embodiment 2 of the present invention.

FIG. 9 shows patterns (concentric circle patterns 201, a spiral pattern 202 and the multiple spiral patterns 204) formed in a rotary scale 200, and arrangement of first and second reading areas 211 and 212 of a sensor unit 301 and a third reading area 214 of a sensor unit 302. The concentric circle patterns 201 and the spiral pattern 202 are same as those in Embodiment 1, and the sensor unit 301 is same as that in Embodiment 1. This embodiment is different from Embodiment 1 in that the multiple spiral patterns 204 are formed in an outer circumference side area of the rotary scale 200. The sensor unit 302 detects signals from the multiple spiral patterns 204.

The first and second reading areas 211 and 212 of the sensor unit 301 (photodiode arrays 311 and 312 described in Embodiment 1) and the third reading area 214 of the sensor unit 302 (photodiode array 313, not shown) are arranged on a same straight line passing through a rotation axis 220 and extending from the rotation axis 220 to a same side as shown in FIG. 9. A center of the first reading area 211 of the sensor unit 301 is located at a position corresponding to a radius of 1.91 mm, and a center of the third reading area 214 of the sensor unit 302 is located at a position corresponding to a radius of 3.98 mm.

Figure 10:
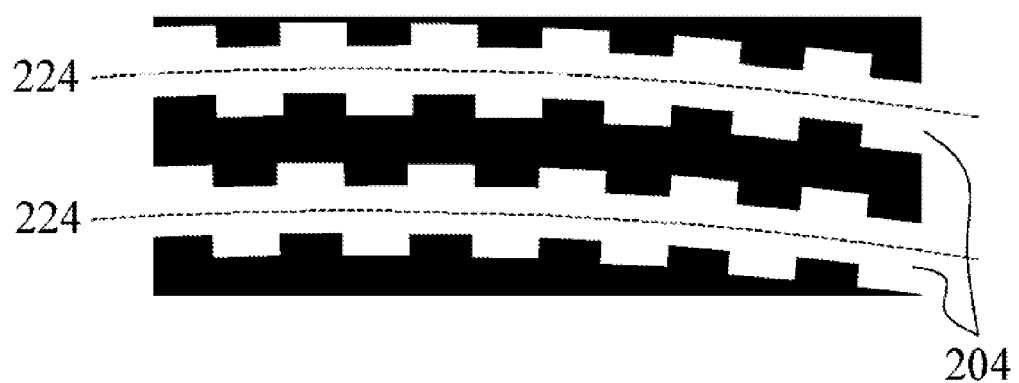
FIG. 10 shows part of multiple spiral patterns in Embodiment 2.

In an area on the rotary scale 200 corresponding to a radius range from 3.4 mm to 4.5 mm, the multiple spiral patterns 204 are formed whose centers are located at the rotation axis 220. FIG. 10 is an enlarged view of part of the multiple spiral patterns 204. When m represents a number of spiral patterns constituting the multiple spiral patterns 204, a represents a radial pitch of the multiple scale patterns 204, and r and θ respectively represent a radius and a phase angle on the rotary scale 200, the multiple spiral patterns 204 are formed along multiple spiral reference lines 224 that are expressed as follows:

$$r = m(a/360)\theta - a(n-1)$$

where n represents an integer from 1 to m. A radial width of each of the multiple spiral patterns 204 is 50 µm. In this embodiment, m=32 and a=100 µm, and an inner circumference side end phase angle θmin of the spiral reference line whose n is 0 among the multiple spiral reference lines is 382.5 degrees, and an outer circumference side end phase angle θmax thereof is 506.25 degrees. The center of the third reading area 214 of the sensor unit 302 is set to a position corresponding to a radius of 3.98 mm.

This embodiment satisfies the following condition:

$$\theta max - \theta min > 540/m.$$

A radial width center of each of the multiple spiral patterns 204 alternately shifts radially inward and outward by 8.333 µm with respect to the spiral reference line 224 at each azimuth angle of 0.72 degrees. In the vicinity of the position corresponding to a radius of 3.98 mm, which is the center of the third reading area 214, a cycle of the shift becomes 100 µm, that is, ⅓ of a circumferential length of the third reading area 214 of the photodiode array 313. As well as the first reading area 212 on the spiral pattern 202, in the third reading area 214, at least one cycle of the multiple spiral patterns 204 in the radial direction is always continuously included in reading areas for A+, A−, B+ and B− phases over the entire rotational angle range.

The photodiode array 313 outputs, as well as the photodiode arrays 311 and 312, a phase output φ4. The phase output φ4 is a periodic signal including 32 periods in one rotation because m is 32 in this embodiment.

In addition, description will be made of a method of calculating the absolute rotational angle. In this description, the phase output from the photodiode array 311 is represented by φ2, and the phase output from the photodiode array 312 is represented by φ1. An upper-order signal φABS is obtained by the following calculation:

$$\phi ABS = \phi 1 - \phi 2.$$

The phase output from the photodiode array 313 is represented by φ4, and the phase output from the photodiode array 311 is represented by φ2. An incremental angle signal φINC is obtained by the following calculation:

$$\phi INC = \phi 4 - \phi 2.$$

In the calculation of the upper-order signal φABS and the incremental angle signal φINC, subtracting the phase output φ2 obtained from the concentric circle patterns 201 from the phase outputs φ1 and φ4 as shown above makes it possible to cancel influences of decentering, tilting and bearing backlash. Furthermore, arranging the first and third reading areas 211 and 214 on the same straight line extending from the rotation axis 220 to the same side makes it possible to cancel error components having a correlation between patterns at a same azimuth angle, caused due to warpage of the rotary scale 200, a magnification error in pattern exposure or the like.

A synchronous process for the upper-order angle signal φABS and the incremental angle signal φINC in this embodiment is same as that in Embodiment 1, and therefore description thereof is omitted.

As describe above, the spiral pattern is not limited to a single spiral, and may be multiple spiral patterns. Also in the case of using the multiple spiral patterns, the rotary encoder can output continuous detection signals over the entire rotational angle range.

The rotary encoder of each of the above-described embodiments is used for position detection of a zoom lens, a focus lens or other optical elements in various optical apparatuses. The optical apparatuses include an image-pickup apparatus such as a still camera and a video camera, and an interchangeable lens. In addition, the rotary encoder of each of the above-described embodiments is used for speed detection of a transferring belt in an image forming apparatus as an optical apparatus such as a copier and a laser beam printer.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2010-213194, filed on Sep. 24, 2010, which is hereby incorporated by reference herein in its entirety.

What is claimed is:

1. A rotary encoder comprising:
a rotary scale including a spiral pattern, whose center is located at a rotation axis of the rotary scale, whose radius continuously changes in a rotation direction of the rotary scale, whose width and pitch in a radial direction of the rotary scale are constant, and whose reflectance or transmittance changes in the rotation direction;
a sensor unit disposed facing the rotary scale and including a light source that illuminates the spiral pattern and a first light-receiving part that detects light entering thereinto via the spiral pattern; and
a signal processor,
wherein the first light-receiving part is constituted by a first sensor array group including at least two sets of sensor arrays arranged at mutually different radial position,
wherein the first sensor array group receives light from a first reading area located on the rotary scale and illuminated by the light source,
wherein an area through which the first reading area is rotated on the rotation axis of the rotary scale includes at least one cycle of the spiral pattern,
wherein the first sensor array group outputs sinusoidal signals corresponding to a radial cycle of the spiral pattern,
wherein the signal processor produces a first phase signal from two phase sinusoidal signals produced based on the sinusoidal signals output from the first sensor array group, and
wherein the signal processor produces, based on the first phase signal, a rotational angle signal showing a rotational angle of the rotary scale.

2. A rotary encoder according to claim 1, wherein:
the rotary scale includes multiple spiral patterns,
when m represents a number of the multiple spiral patterns, a represents the radial cycle of the multiple scale patterns, r and θ respectively represent a radius and a phase angle θ of the multiple scale patterns, and n represents an integer from 1 to m, the multiple spiral patterns are formed along spiral reference lines that are expressed by the following expression:

$r = m(a/360)\theta - a(n-1)$, and wherein the following condition is satisfied:

$\theta max - \theta min > 540°/m$, where θmax represents a phase angle of an outer circumference side end of the spiral reference line, and θmin represents a phase angle of an inner circumference side end of the spiral reference line.

3. A rotary encoder according to claim 1, wherein:
the rotary scale further includes concentric circle patterns, whose centers are located at the rotation axis, whose widths and pitch in the radial direction are constant, and whose reflectance or transmittance changes in the rotation direction,
the sensor unit further includes a second light-receiving part that is disposed in a plane in which the first light-receiving part is disposed, and that detects light via the concentric circle patterns illuminated by the light source,
the second light-receiving part is constituted by a second sensor array group including at least two sets of sensor arrays arranged at mutually different radial position,
the second sensor array group receives light from a second read area located on the rotary scale and illuminated by the light source,
wherein an area through which the second reading area is rotated on the rotation axis of the rotary scale includes at least one cycle of the concentric circle patterns,
the second sensor array group outputs sinusoidal signals corresponding to a radial cycle of the concentric circle patterns,
the signal processor produces a second phase signal from two phase sinusoidal signals produced based on the sinusoidal signals output from the second sensor array group, and
the signal processor produces, based on the first and second phase signals, the rotational angle signal.

4. A rotary encoder according to claim 3, wherein the first reading area and the second reading area are located on a same straight line passing through the rotation axis.

5. A rotary encoder according to claim 1, wherein the rotary scale further includes a radial pattern for obtaining an incremental signal, whose center is located at the rotation axis.

6. A rotary encoder according to claim 1, wherein:
the spiral pattern is radially displaced at a constant angular cycle, and
an integral multiple of the constant angular cycle is equal to a circumferential length of the first reading area on the spiral pattern for a circumferential length of the sensor array in the first sensor array group.

7. A rotary encoder according to claim 3, wherein:
each of the concentric circle patterns is radially displaced at a constant angular cycle, and
an integral multiple of the constant angular cycle is equal to a circumferential length of the second reading area on the concentric circle patterns for a circumferential length of the sensor array in the second sensor array group.

8. An optical apparatus comprising:
a rotary scale comprising:
a rotary scale including a spiral pattern, whose center is located at a rotation axis of the rotary scale, whose radius continuously changes in a rotation direction of the rotary scale, whose width and pitch in a radial direction of the rotary scale are constant, and whose reflectance or transmittance changes in the rotation direction;
a sensor unit disposed facing the rotary scale and including a light source that illuminates the spiral pattern and a first light-receiving part that detects light entering thereinto via the spiral pattern; and
a signal processor, wherein the first light-receiving part is constituted by a first sensor array group including at least two sets of sensor arrays arranged at mutually different radial position, wherein a first reading area, which is where the first sensor array group reads the spiral pattern, is sized to cover at least one cycle of the spiral pattern in the radial direction over an entire rotational angle range of the rotary scale, wherein the first sensor array group receives light from a first reading area located on the rotary scale and illuminated by the light source, wherein an area through which the first reading area is rotated on the rotation axis of the rotary scale includes at least one cycle of the spiral pattern, wherein the first sensor array group outputs sinusoidal signals corresponding to a radial cycle of the spiral pattern, wherein the signal processor produces a first phase signal from two phase sinusoidal signals produced based on the sinusoidal signals output from the first sensor array group, and wherein the signal processor produces, based on the first phase signal, a rotational angle signal showing a rotational angle of the rotary scale.

* * * * *